(12) United States Patent
Rakoczi

(10) Patent No.: US 11,760,270 B2
(45) Date of Patent: Sep. 19, 2023

(54) ROOF CARGO SYSTEM

(71) Applicant: Viktor Rakoczi, Immenstaad am Bodensee (DE)

(72) Inventor: Viktor Rakoczi, Immenstaad am Bodensee (DE)

( * ) Notice: Subject to any disclaimer, the term of this patent is extended or adjusted under 35 U.S.C. 154(b) by 130 days.

(21) Appl. No.: 17/398,882

(22) Filed: Aug. 10, 2021

(65) Prior Publication Data

US 2022/0041112 A1    Feb. 10, 2022

(30) Foreign Application Priority Data

Aug. 10, 2020   (DE) .................... 10 2020 004 864.1

(51) Int. Cl.
*B60R 9/06*    (2006.01)
*B60R 9/058*   (2006.01)

(52) U.S. Cl.
CPC .................................. *B60R 9/058* (2013.01)

(58) Field of Classification Search
CPC ..................................................... B60R 9/058
USPC ......................................................... 224/331
See application file for complete search history.

(56) References Cited

U.S. PATENT DOCUMENTS

| | | | | |
|---|---|---|---|---|
| 2,667,295 A * | 1/1954 | Johnston | ............... | B60P 3/1025 224/310 |
| 3,153,501 A * | 10/1964 | Binding | .................. | B60R 9/055 224/330 |
| 3,901,422 A * | 8/1975 | Anderson | ............... | B60R 9/055 224/327 |
| 4,362,258 A * | 12/1982 | French | ...................... | B60P 3/34 296/160 |
| 4,974,766 A * | 12/1990 | DiPalma | ................. | B60R 9/055 224/315 |
| 5,346,355 A * | 9/1994 | Riemer | .................... | B60R 9/042 224/310 |
| 5,853,278 A * | 12/1998 | Frantz | ....................... | B60R 9/06 224/504 |
| 8,123,270 B2 * | 2/2012 | Baccelli | ................... | B60J 7/165 296/217 |

(Continued)

FOREIGN PATENT DOCUMENTS

DE    196 23 569 A1    6/1997
DE    199 04 532 A1    8/2000

(Continued)

*Primary Examiner* — Peter N Helvey
(74) *Attorney, Agent, or Firm* — Walter Ottesen, P.A.

(57) ABSTRACT

A roof cargo box system for transporting an article on a vehicle includes a roof cargo box and a roof cargo box carrier for mounting on a vehicle. The box includes a flexible shell for accommodating the article to be transported. The roof cargo box defines a longitudinal axis and has at least three frames which extend in respective planes transversely to the longitudinal axis. The frames are configured to receive the flexible shells spanned thereon. A scissors mechanism pulls the frames into a predetermined spaced relationship to each other along the longitudinal axis. The carrier for mounting a roof cargo box on the vehicle includes a first attachment unit for mounting on the vehicle and a second attachment unit for attachment to the roof cargo box. The roof cargo box carrier also includes a separable mechanism for rotating the attachment units relative to each other by at least 90°.

15 Claims, 7 Drawing Sheets

(56) References Cited

U.S. PATENT DOCUMENTS

| | | | |
|---|---|---|---|
| 2006/0175368 A1* | 8/2006 | Fallis, III | B60R 9/055 224/310 |
| 2015/0353023 A1* | 12/2015 | Schierk | B60R 9/058 224/331 |
| 2016/0250979 A1* | 9/2016 | Nieto | B60R 7/08 224/313 |

FOREIGN PATENT DOCUMENTS

| | | |
|---|---|---|
| DE | 20 2015 100 839 U1 | 5/2016 |
| JP | 2002-114106 A | 4/2002 |

\* cited by examiner

ROOF CARGO SYSTEM

CROSS REFERENCE TO RELATED APPLICATION

This application claims priority of German patent application no. 10 2020 004 864.1, filed Aug. 10, 2020, the entire content of which is incorporated herein by reference.

TECHNICAL FIELD

The disclosure relates to a roof cargo box system having a roof cargo box and a roof cargo box carrier provided therefor. In particular, the disclosure relates to a roof cargo box to be attached to a vehicle via a roof cargo box carrier.

BACKGROUND

A roof cargo box can be attached to a roof of the vehicle for transporting bulky objects with a passenger car. The objects can, for example, include a surf board or skis and can be received in the roof cargo box. The roof cargo box is often configured rigidly, for example, as a shell construct of plastic and can also be referred to as a roof cargo container.

Disadvantageous with known constructions is that the attaching and removing of the roof cargo box can be difficult due to its poor accessability. A secure connection between the roof cargo box and the vehicle can be laborious to achieve or release. The storage of a rigid cargo box, when not in use, can require a significant amount of room in a storage space such as a garage or cellar compartment. Known roof cargo boxes are often only accessible from one side of the vehicle so that adding or removing, for example, a long object from a mounted roof cargo box can require a substantial amount of energy or coordination on the part of a user.

For securing an article to be transported with or without a roof cargo box, belts or ropes can be used. The article is thereby typically secured force tight by several belts or ropes on the roof carrier of the vehicle. Disadvantages of this type of attachment are, in addition to the considerable effort associated therewith with respect to ergonomic accessibility and precision in the application of the belts itself, also the danger of pressure points or damage to the article because of the rigid application of the belts.

SUMMARY

An object of the present invention is to provide improved technology for transporting an article on a vehicle such as a passenger automobile.

According to a first aspect of the invention, a roof cargo box is provided for mounting on a vehicle. The roof cargo box includes: a flexible shell for accommodating an article to be transported; the flexible shell defining a longitudinal axis; at least three frames extending in respective planes transversely to the longitudinal axis; the frames being configured to receive the flexible shell spanned thereon transversely to the longitudinal axis; and, a scissors mechanism to hold the frames in a predetermined spaced relationship to each other along the longitudinal axis.

The roof cargo box of the disclosure, when it is emptied, can, in its longitudinal direction, be collapsed along its longitudinal axis so that it takes up less volume and is easier to handle. An interior space of the roof cargo box can be greatly reduced in size by collapsing the same so that its outer dimensions are only a fraction of the dimensions it assumes in the expanded state. The mounting or removal of the collapsed roof cargo box from a vehicle can be made easier. The collapsed roof cargo box can easily be stored, for example, when it is to be stored in a cellar or in a garage. Via the scissors mechanism, the roof cargo box can be easily extended along the longitudinal axis or can be expanded to accommodate one or several articles. Here, the scissors mechanism provides that the frames are moved along predetermined paths parallel to each other so that the shell uniformly unfolds. A frame is preferably accommodated in the shell and presents a lateral support force on the shell. In an embodiment, a frame lies on its outer side on the shell, preferably about the periphery. The frames can be pointwise or peripherally connected to the shell and generally be configured in a manner of a corrugation or rib.

It is further preferred that the roof cargo box have its widest and highest location in a mid region thereof with reference to its longitudinal axis and from this mid region, the roof cargo box can be flatter and/or narrower toward the forward region and the rearward region. In a longitudinal section through the longitudinal axis, the roof cargo box can have an essentially elliptical outline. Here it is further preferred that the roof cargo box, at least in the mid region, is wider and higher. In an especially preferred embodiment, the roof cargo box can be configured to accommodate a surf board. In addition, additional accessories such as a sail, a wishbone boom, a fin or a sword can be accommodated in the roof cargo box. An inner space of the roof cargo box can be adapted to dimensions of the surf board or another article to be transported. Especially, an inner space of the roof cargo box along the longitudinal axis can be so dimensioned that the article to be transported contacts the shell at the front and the rear when the article is in the closed roof cargo box. In this way, the scissors mechanism can be fully expanded so that the shell exercises a stabilizing effect on the roof cargo box.

It is further preferred that the scissors mechanism is configured to hold the frames in a predetermined spaced relationship to each other. Stated otherwise, the frames can be arranged with uniform spacings along the longitudinal axis independently as to whether the roof cargo box is extended or collapsed in a longitudinal axis.

It is especially preferred that the roof cargo box can be brought into a first configuration and a second configuration. The first configuration can be extended or expanded and the second configuration can be collapsed or compressed. In the first configuration, the shell is spanned in longitudinal direction between the frames and the roof cargo box assumes a first length. In the second configuration, the shell is folded in longitudinal direction between the frames and the roof cargo box assumes a second length which is less than the first length. Here, it is especially preferred that the first length is at least three times as great as the second length. For example, the first length can be approximately 1.8 meters and the second length can be 0.5 meters.

In a further embodiment, the roof cargo box can, in the compressed configuration, be packed by a cover. The cover can be configured to be pulled onto the roof cargo box arranged on the roof of the vehicle. In this way, the aerodynamics of the compressed roof cargo box can be improved. The penetration of contaminants can be prevented. Damaging effects from ultraviolet light on the shell can be prevented with the shell being folded or bent between the frames. Furthermore, the cover can protect the roof cargo box, which is removed from the vehicle, against contaminants or mechanical effects. If the cover is not needed, then it can be stored in the shell.

It is further preferred that the shell is made of a stretchable material. Stretchability of the shell can at least amount to approximately 5%. The material of the shell can furthermore be water tight, air resistant and/or such that it cannot pass light. For example, the shell can be made of a material which is used for a covering of a convertible. Another possible material includes a synthetic rubber such as chloroprene rubber on which a variant is known under the commercial designation of neoprene. The cover can be made of a similar material.

The shell can have a horizontal zipper closure in a forward or rearward region in order to place an article in the shell or to remove an article therefrom. The zipper can be applied on the forward or rearward end of the roof cargo box especially symmetrically to the longitudinal axis so that a loading or unloading directly from front or rear can take place in an improved manner. In this way, it can be easier to place an especially long article such as a surf board or a pair of skis in the roof cargo box or to remove the same therefrom.

As an option, a latch mechanism can be provided in order to hold the scissors mechanism in a predetermined position. The position can especially correspond to a first configuration referred to above. An unintended leaving of the first constellation, for example, when loading or unloading the roof cargo box, can be prevented in this way.

A section of the shell can be reinforced by a mesh of fibers or wires. The reinforcement can especially be provided in a section which is more strongly subjected to bending than other sections or is subjected to pull, especially when the roof cargo box is in the first configuration. The reinforcement can also be provided in a region which is often subjected to abrasive loads.

In order to be able to open the roof cargo box in an improved manner, a frame can be partitionable in the region of the zipper. Preferably, several frames can be partitionable especially on one side of a mid section of the roof cargo box. In a first embodiment, the frame can be partitioned into two parts of which they can remain on respective different sides of the opened zipper on the shell. In a second embodiment, the frames include two parts which via a lock and a hinge are connected to each other. If the lock is opened then the two parts are flipped open on the hinge. In a further embodiment, two hinges on different sides of a lock are provided so that after opening the lock, two parts of the frame opposite a third in the manner of a two way gate can be opened. The lock can, for example, be spring biased; it can be held closed via a magnet or a latch mechanism.

According to a second aspect of the present invention, a roof cargo box carrier for mounting a roof cargo box on a motor vehicle includes the following: a first attachment unit for mounting on the vehicle; a second attachment unit for attachment for mounting on the roof cargo box; and, a mechanism for rotating the attachment units relative to each other about at least 90°. The roof cargo box can be rotated with respect to the motor vehicle by at least 90°, preferably about an upward axis of the roof cargo box, of the roof cargo box carrier and/or of the vehicle. In this way, it can be clearly easier to handle the roof cargo box on the vehicle. The roof cargo box can be better loaded or emptied.

The compressed roof cargo box can, in an embodiment, in rotation about its upward axis, be so aligned that its end face is made smaller in the driving direction of the vehicle. The roof cargo box can, before or after the rotation, be compressed. A longitudinal axis of the rotated roof cargo box preferably runs transverse to a longitudinal axis of the vehicle whereat the roof cargo box during the drive of the vehicle is preferably aligned parallel to the longitudinal axis of the vehicle. The roof cargo box can support this rotation and the rotated roof cargo box can be latched in one or both positions.

The rotation can cause the situation that the roof cargo box, in the compressed configuration, is aligned on the vehicle with improved streamlining. A front surface of the roof cargo box, which faces the driving direction, can be significantly reduced in size. An air resistance of the vehicle with the roof cargo box can thereby be reduced. Furthermore, disturbing wind noises during driving are reduced.

The mechanism is partitionable in order to permit a separation of the first attachment unit from the second attachment unit. In this way, the roof cargo box can be easily taken from the vehicle. The first attachment unit can remain on the vehicle and the second attachment unit can remain on the roof cargo box. Especially when the roof cargo box is mounted on the vehicle often or removed therefrom, the separability of the mechanism effects a significant improvement in handling. Especially, the mechanism, in a first rotational position, can be brought together with its two parts and can then be brought into a second rotational position. The mechanism is preferably not adjustable into an either side rotational position but only in the first rotational position or in several predetermined rotational positions.

Especially, the roof cargo box carrier can be set up so that the mechanism divides or closes when the roof cargo box is transverse to the vehicle. If the closed mechanism is then rotated so that the roof cargo box is parallel to the vehicle, then a separation of the mechanism can be prevented. One or several rotational positions wherein the partitioning or closing is possible can be preset.

The mechanism can be realized in different ways. In a preferred embodiment, a slot guide is used which includes a slot and a slot stone guided in the slot. In an especially preferred embodiment, the first attachment unit includes a first slot which follows a horizontal circular line as well as a second slot and a third slot which run along two secants to the circular line. The secants run on different sides of the diameter of the circular line and are at the same distance to the diameter. The second attachment unit preferably includes four slot stones which are separated such that two of the slot stones are pushed into the second slot and two others are pushed into the third slot in such a manner that the four slot stones also lie in the first circular shaped slot.

In an embodiment, a latch is provided in order to hold a slot stone, which is introduced into a slot, in the slot. Unintended separation of the roof cargo box from the roof cargo box carrier can thereby be prevented.

The second slot and the third slot run preferably transversely to a longitudinal axis of the vehicle. The mechanism can be closed in that the four slot stones laterally and in pairs are pushed into the second and third slots until they lie at intercepts of the secants with the circular line. In this position, the second attachment unit can be rotated relative to the first attachment unit without an upward axis. The four slot stones can leave the second and third slots and only to be guided in the first slot. The rotational movement can latch when the first attachment unit assumes a predetermined alignment with reference to the second attachment unit, especially when a roof cargo box, which is connected to the second attachment unit, is parallel to a vehicle connected to the first attachment unit. To separate the mechanism, the described operation is carried out in the reverse sequence.

In a further embodiment, a fourth slot and a fifth slot are provided which run perpendicular to the second and third slots. Especially, the fourth and fifth slot extend in the longitudinal direction of the vehicle when the roof cargo box carrier is mounted on the vehicle so that two slot stones in the last-mentioned position come to lie and via the fourth and fifth slot are moved respectively forward or rearward. A corresponding movability can be made possible via additional or throughgoing fourth and fifth slots for the other two slot stones on the opposite-lying side of the circular line. The two attachment units can, in this way, be displaced entirely or section wise relative to the first in longitudinal direction. In an embodiment, in this way, the roof cargo box can be repositioned longitudinally on the vehicle. In another embodiment, the roof cargo box can be extended in the longitudinal direction. The roof cargo box carrier can especially in combination with a herein described roof cargo box be used. In an embodiment, the slot stones are in pairs connected in such a manner with the scissors mechanism of the roof cargo box that the roof cargo box is extended when two of the slot stones are displaced from each other relative to two other slot stones along the longitudinal axis.

According to a further aspect of the present invention, a system includes a herein described roof cargo box and a herein described roof cargo box carrier. The roof cargo box can be expanded and compressed. The compressed roof cargo box has a significantly less volume than the expanded roof cargo box. The roof cargo box carrier can permit a rotation of the compressed roof cargo box about an upward axis. In this way, the compressed roof cargo box can be brought into an aerodynamically favorable position. Accordingly, the roof cargo box can during non-use save space and energy and remain on the vehicle.

In a system, the roof cargo box, which is brought into the second configuration, can be rotated relative to the roof cargo box carrier about an upward axis to at least 90°. An end face of the roof cargo box with reference to the driving wind and when the vehicle is in movement, can be minimized by the rotation. Especially, a longitudinal axis of the roof cargo box can be brought transversely to the vehicle in order to minimize the end face of the compressed roof cargo box. A wind resistance and a wind noise can thereby be reduced.

BRIEF DESCRIPTION OF THE DRAWINGS

The invention will now be described with reference to the drawings wherein.

DESCRIPTION OF THE PREFERRED EMBODIMENTS

Figure 1:
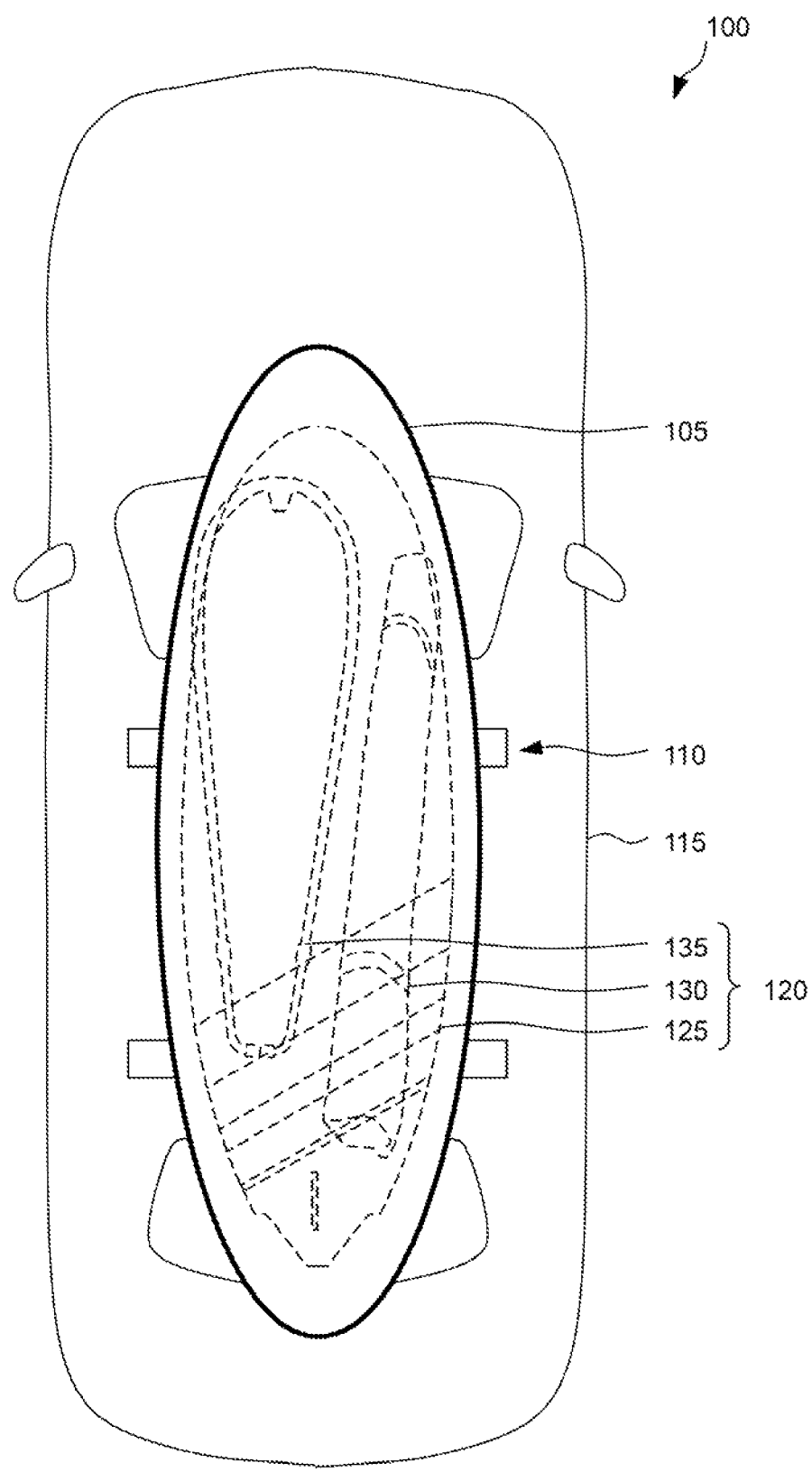
FIG. 1 is a schematic showing a roof cargo box and a roof cargo box carrier on a vehicle.

FIG. 1 shows a system 100 which includes a roof cargo box 105 and at least a first roof cargo box carrier 110 by way of example. The roof cargo box carrier 110 is configured to bring the roof cargo box 105 onto a vehicle 115. The vehicle 115 can be especially a passenger car or a small bus. Usually, the roof cargo box carrier 110 is arranged on the roof of the vehicle 115, for example: on a roof railing provided as part of the motor vehicle 115; on a predetermined attachment point; or, for example, via a magnet or a suction cup. The roof cargo box 105 is configured to accommodate articles 120 which are intended to be transported on the roof of the vehicle 115. The articles 120 are usually those which are bulky.

Figure 2:
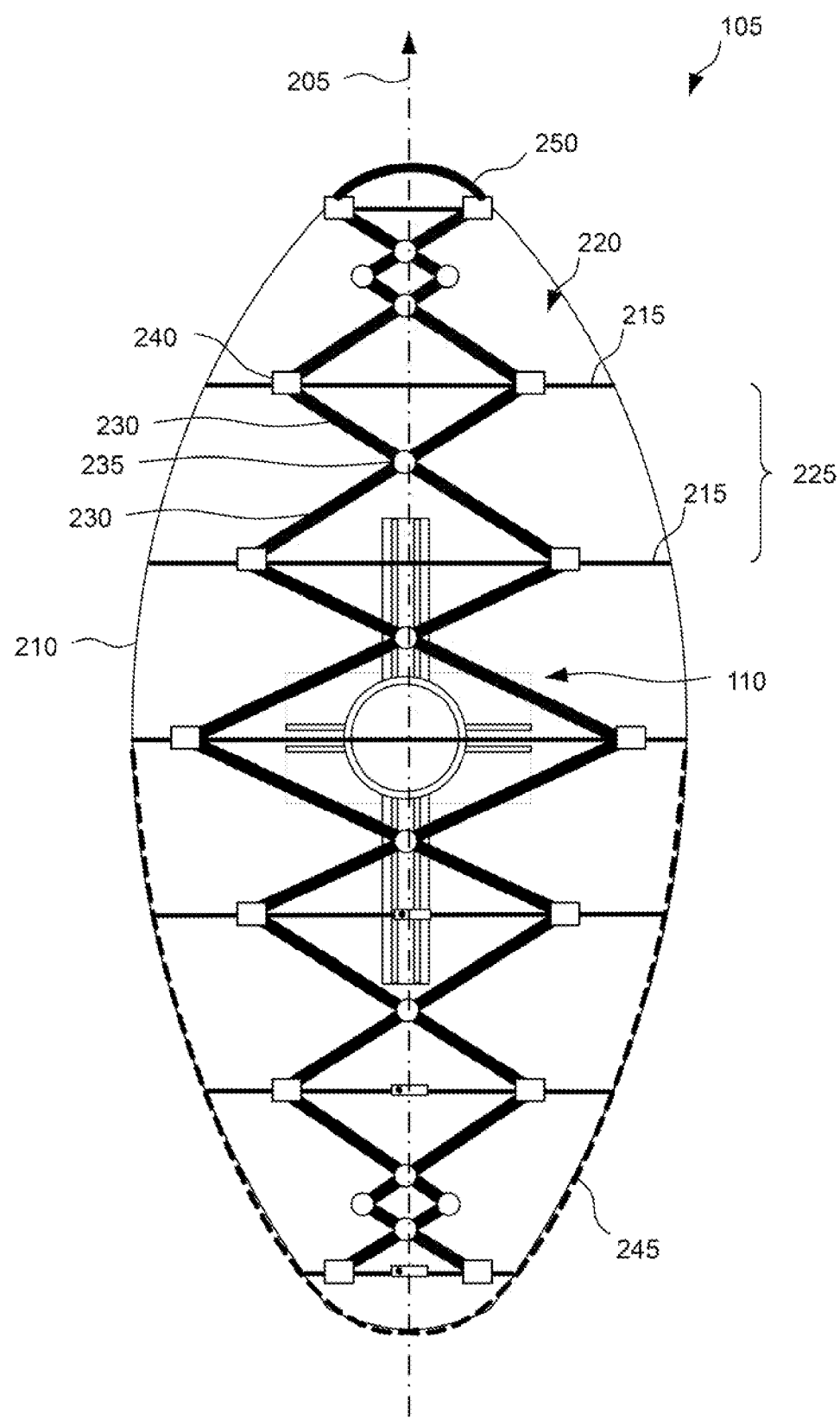
FIG. 2 shows a roof cargo box in a schematic plan view.

FIG. 2 is a schematic showing a roof cargo box in plan view. The roof cargo box 105 is shown partially transparent to facilitate a description of its assembly and the interrelationship with the roof cargo box carrier 110. The roof cargo box 105 extends along a longitudinal axis 205 which is usually parallel to a longitudinal axis of the vehicle 115 when the roof cargo box 105 is mounted by means of a first roof cargo box carrier 110 on the vehicle 115.

The roof cargo box 105 includes a flexible shell 210 which can be set up via a series of frames 215. A frame 215 can have an essentially elliptical cross section as explained in more detail by way of example with reference to FIGS. 3A and 3B hereinafter. The frames 215 preferably lie on an inner side of the shell 210. Here, it is further preferred that the flexible shell 210 lies against a frame 215 as completely as possible in a direction perpendicular to the longitudinal axis 205. The shell 210 can be attached to the frame 215 point by point or along the entire peripheral length of the frame 215. An article, which is to be transported in the roof cargo box 105, can be enclosed by a frame 215 in a direction perpendicular to the longitudinal direction 205 of a frame 215. An elastic element such as a foam insert or a rubber lip can be provided on an inner side of the frame 215 in order to avoid a pressure point or damage to the article 120. The elastic element can permit a transport of an article 120 without an additional attachment in the interior of the roof cargo box 105. Stated otherwise, the article 120 can lie loose in the interior of the roof cargo box and is protected by the elastic element against displacement.

A number of frames 215 can be uneven in number so that a center frame 215 is present. This center frame 215 preferably exhibits the largest dimensions in the transverse direction and/or upward direction. For an even number of frames 215, two frames 215 of like size can be mounted in a center region and exhibit maximum expansion transverse to the longitudinal axis 205. Starting from the center region toward front and/or toward the rear, the dimensions of the frames 215 can reduce in the transverse direction and/or in the upward direction. An outline of the roof cargo box 105 is preferably symmetrical to the longitudinal axis 205 and can be additionally symmetrical to a transverse axis which runs in a center region transversely to the longitudinal axis 205.

The frames 215 are held in predetermined relative distance relationships via a scissors mechanism 220. Preferably, the distances between mutually adjacent frames 215 along the longitudinal axis 205 are all the same. The scissors mechanism 220 includes a number of sections 225 which lie between each two mutually adjacent frames 215 and are configured essentially the same. A section 225 includes two levers 230 which are rotatably mutually connected by a rotational joint. 235 rotatable about an upward axis. An end of each lever 230 is connected to a slider 240. The slider 240 is mounted on a frame 215 so as to be displaceable in transverse direction. A connection between the lever 230 and the slider 240 is preferably likewise rotatable about an upward axis. When four sliders 240 are mounted on the ends of the two levers 230 on mutually adjacent frames 215, the frames 215 can be brought parallel closer to each other or separated from each other in that an angle between the levers 230 is changed at the rotational joint 235. Lever 230 of an adjacent section 225 can engage at the same slider 240. The ratio of distances between frames 215 can in this way be held constant while the scissors mechanism 220 can be pushed together or expanded.

A slider 240 can be free or limited in its movement along a frame 215. To limit, one or two stops can be provided on the frame 215 which limit the sliders 240 and their respective movements along the frame 215.

A latch mechanism can be provided in order to better hold a slider 240 in a predetermined position along the frame 215. The latch mechanism can include a latch element which is movable perpendicularly to the displacement direction and is pretensioned by an elastic element. The mechanism can latch when the slider 240 has reached the provided position. The latch element is preferably mounted on the slider 240 and latches into a depression on the frame, for example, a bore or a groove. On the other hand, the latch element can also be mounted on the frame 215 and engage in a depression on the slider 240.

An end of the latch element, which engages in the depression, can be round or have the shape of a half ball. A predetermined force in the displacement direction is overcome for a further displacement of the slider 240 latched on the frame 215.

The latch mechanism can also be released in that the latch element is movable manually out of the depression. If the end of the latch element is linear, then a manual release is required in order to again displace the slider 240 with respect to the frame 215. To release, a force can be applied directly or via the shell 210 on the latch element. One location at which the force can be applied to the latch element is in a further embodiment only accessible when the zipper 245 of the shell 210 is opened.

The latch mechanism can also be applied together with a stop. Latch mechanisms on several sliders 240 can be matched to each other in order to latch respectively when the roof cargo box 105 is in a predetermined configuration. Especially, one or several latch mechanisms can contribute to hold the roof cargo box 105 against a mechanical tension of the shell 210 in a first configuration described herein.

A frame 215 can be too small in the transverse direction in order to make available an adequate displacement for a slider 240 as, for example, in the uppermost and lowermost shown sections 225. In this situation, in a contiguous section 225, also four levers 230 can be used which, in pairs, can be mutually connected via a rotational joint 235. Their ends, which are remote from their respective frames 215, can be coupled to each other in pairs via further rotational joints 235 as shown in FIG. 2.

In order to increase the stiffness of the scissors mechanism, it is preferable to select the levers 230 as long as possible in view of available displacement paths on the frames 215. A lever 230 can, especially, be configured to be flat and made of a steel strip, for example.

The roof cargo box 105 can be expanded along the longitudinal axis 205 in that it can be brought into its maximum length along the longitudinal axis 205. For this purpose, an article 120 can be placed in the shell 210 which, when closing the shell 210, fills out a maximum length thereof.

In a further preferred embodiment, two sliders 240, which are mounted on the same frame 215, can be moved toward each other in the transverse direction. For this purpose, a pull rope, for example, can be provided. The pull rope can run one way or two ways over a redirection roller which is mounted on one of the sliders 240.

In a still further embodiment, a pulley can be provided between the sliders 240 in order to effect an increase in expansion force in the longitudinal direction 205. The ends of the pull rope or pulley can lie on an inner side or an outer side of the shell 210. In a still further embodiment, a handle can be provided in order to manually expand the roof cargo box 105.

The shell 210 can preferable be at least partially horizontally partitioned via a zipper 245. The zipper 245 extends preferably symmetrically to the longitudinal axis 205 so that a predetermined section of the shell 210 can be opened from the front or from the rear along the longitudinal axis 205 in order to flap open a part of the shell. In FIG. 2, the zipper 245 is arranged, for example, in the rearward region and extends to the frame 215 having the largest dimension in cross section. To introduce or remove an article 120, one or more of the sections 225 can be opened. The sections 225 can be exposed or made accessible via the opened zipper 245 under the shell 210.

A further zipper 245 can be provided on the upper side of the shell 210 in order to permit access into the interior of the shell 210. The zippers 245 can each include two-way closures which can include two or more movable pushers for opening or closing.

The shell 210 is strengthened in sections or everywhere with an additional layer of flexible but tear resistant materials. One such strengthening can be arranged especially in the region of high friction loading, bending loading or pull loading on the shell 210. For example, the reinforcement can be used in a targeted manner in regions which lie on the frame 215 or an element of the scissors mechanism 220. The reinforcement material can include a wire mesh.

It is optional to provide an end element 250 at an end of the roof cargo box which is not to be opened. The end element 250 can be a dish-shaped, in part rigid, insert for shaping. The end element 250 can lie rigidly or movably to the frame 215. Alternatively, the end element 250 can be attached to the shell 210, for example, via sewing, gluing or rivoting.

The shell 210 has an inlet or an outlet for air at the forward or rearward of the roof cargo box 105. This inlet can be covered with a finely woven, flexible grid. Accordingly, a through draft of air through the roof cargo box 105 is made possible. Wet articles accommodated in the expanded roof cargo box 105 can so be better dried. For this purpose, a driving wind of a motor vehicle transporting the roof cargo box 105 can be utilized. An inlet or outlet can be closed via a section of the shell 210, for example, via a zipper 245. A further zipper 245 can be provided for the purpose of securing a loose section at the inlet or outlet. Against a disturbing noise, a half open pocket can be provided for a pusher of the zipper 245.

The zipper 245 can be entirely or partially made from a thermoplastic material such as polypropylene, an acrylonitrile butadiene styrene copolymer (ABS), polyurethane or a combination thereof. Preferably, the zipper 245 and/or the shell 210 are made at least partially from a thermoplastic polyurethane such as poly(adiabatic)ester on the basis of thermoplastic polyurethane, for example, ISOTHANE 1055D.

The roof cargo box 105 can have several sections in the longitudinal direction which are mutually partitioned via flexible elements. One such element can include a textile or a grid which is attached to the shell 210 in radial direction on the shell 210 or separate therefrom. Several zippers can be provided along the system on the shell 210. Between the zippers, there can be a transition between sections 225.1,

225.2 or 225.3. A strip of a zipper can be integrated with a section 225.1 to 225.3 approximately in that both parts are manufactured via injection molding in a work step. Alternatively, a plastic material can be injected onto another part.

Figure 3A:
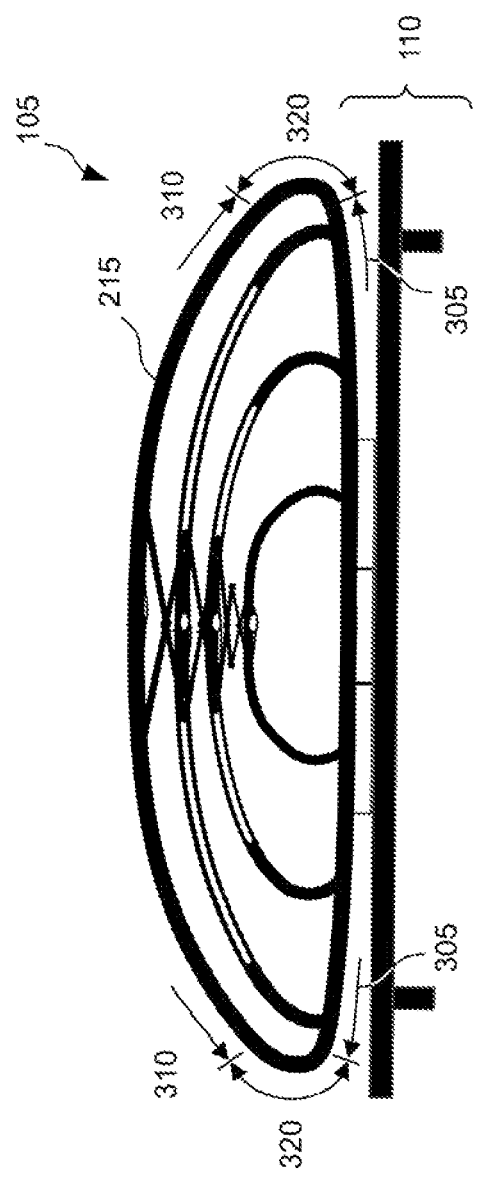
FIGS. 3A and 3B show a roof cargo box in longitudinal section in different states.
Figure 3B:
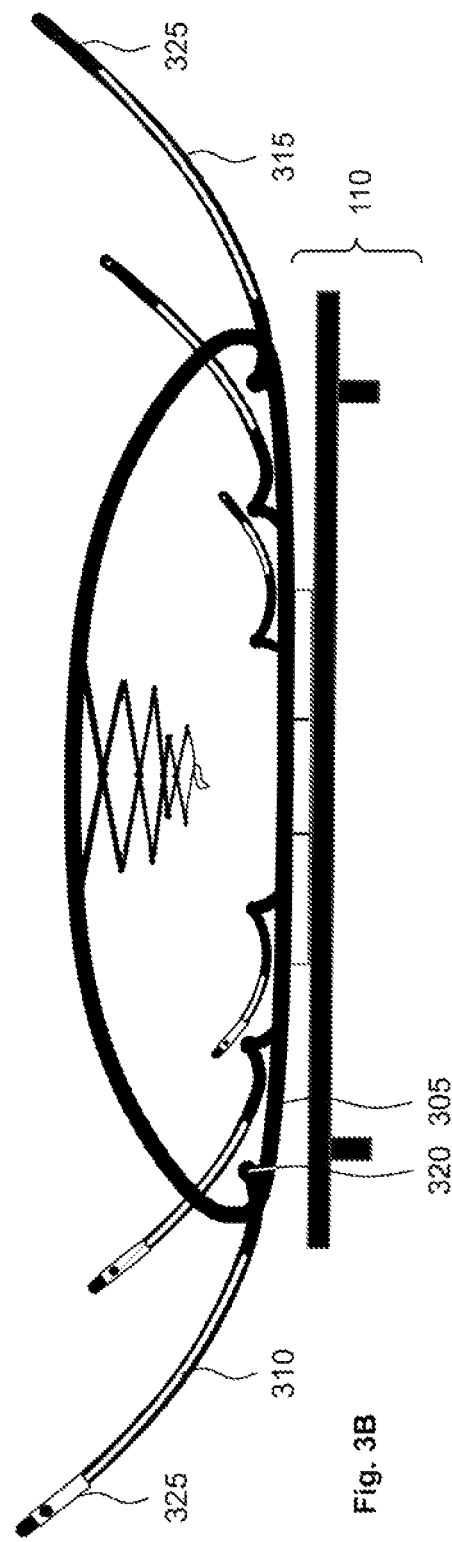

FIGS. 3A and 3B show a roof cargo box 105 in longitudinal section in different states. FIG. 3A shows the roof cargo box 105 with closed frames 215 and FIG. 3B shows the roof cargo box with opened frames 215. Referring to FIG. 2, a section plane runs transversely to the longitudinal axis 205 directly ahead of the widest frame 215. A viewing direction is toward the rear in the direction of the zippers 245. The shell 210 is not shown.

FIG. 3A shows that an inner space of the roof cargo box 105 is preferably flattened on its underside. The interior space is defined by the frames 215. It is further preferred that a bottom or base of the interior space is curved slightly concavely. The frames 215 can otherwise be essentially elliptical. It is further preferred that a frame 215 has no sharp edges or points and the shell 210 is not subjected to point loads.

As FIG. 3B shows, a frame 215, which is exposed by the zipper 245, can include three sections. A first section 305 can, for example, be arranged in the region of a bottom of the interior space of the roof cargo box 105 and can also be referred to as a bottom section. The ends of the first section 305 lie preferably on different sides of the longitudinal axis 205. The first sections 305 preferably lie symmetrically. On the left end, a second section 310 and on a right end, a third section 315 can, in each case, be provided via a snap joint 320. A first section 305 and/or a second section 310 or third section 315 can be made of a flat profile such as likewise of plastic or a light metal. The surface profile can, for example, be made by injection molding, continuous casting or extrusion.

The snap joint 320 permits a pivoting of the sections 310, 315 along a rotational axis relative to the first section 305. The rotational axis can extend parallel to the longitudinal axis 205. The remote ends of the sections 310 and 315 can be force locked to each other via a lock 325. A lock 325 can preferably be closed so that the ends of the sections 310, 315 are latched with each other. For opening, it can be required that a lever or a key be actuated at the lock 325. In this way, unintended opening of a lock 325 is prevented. The lock 325 can include an axial displaceable hollow cylinder which can be pushed over a cylinder. Cylinders and hollow cylinders can be secured one upon the other vie a latch mechanism of a bayonet lock or via mutual threadable engagement. The hollow cylinder can be axially pretensioned by a spring in order to operate against an unintended release.

A frame 215, which does not have snap joints 320, can be configured of multiple parts. For this purpose, the snap joint 320 is replaced by a fixed element which preferably is made of plastic, especially by injection molding. The fixed element can include a reinforcement, which is made of another material, for example, a fiber material such as glass fiber, carbon fiber or aramid fiber. The sections 305 to 315 can be rigidly brought one to another together as desired. For this purpose, a section 305 to 315 preferably is inserted into a corresponding cutout of the fixed element.

The sections 305 to 315 can be configured to be massive, hollow or opened at one side. Optionally, a cutout can be provided to save on weight or material. The cutout can extend in or through the material of sections 305 to 315. If these sections 305 to 315 are made by casting or injection molding, then the section can be open on one longitudinal side. In the accessible hollow space achieved in this manner, reinforcements can be provided, for example, in the form of struts, ribs or honeycomb structure. A reinforcement is preferably carried out as one piece with the corresponding sections 305 to 315. However, the reinforcement can also include: an inserted part, an injection molded or a mounted part which can also be of another material. With the use of one or several reinforcements, resistance to bending or torsion in increased. The resistance to bending can be influenced in a targeted manner in order to ensure a tensioning of the shell 210. Optionally, a section 305 to 315 is differently bendable along its extent so that a predetermined form of the shell 210 is supported by the uneven distributed bendability.

Sections 305 to 315, snap joint. 320 and the fixed elements, which replace the latter, can be assembled into frame 215. Here, one can proceed in accordance with the building block principle in order to utilize one or several of the sections 305 to 315 as like parts possibly on the roof cargo box 105.

Figure 4A:
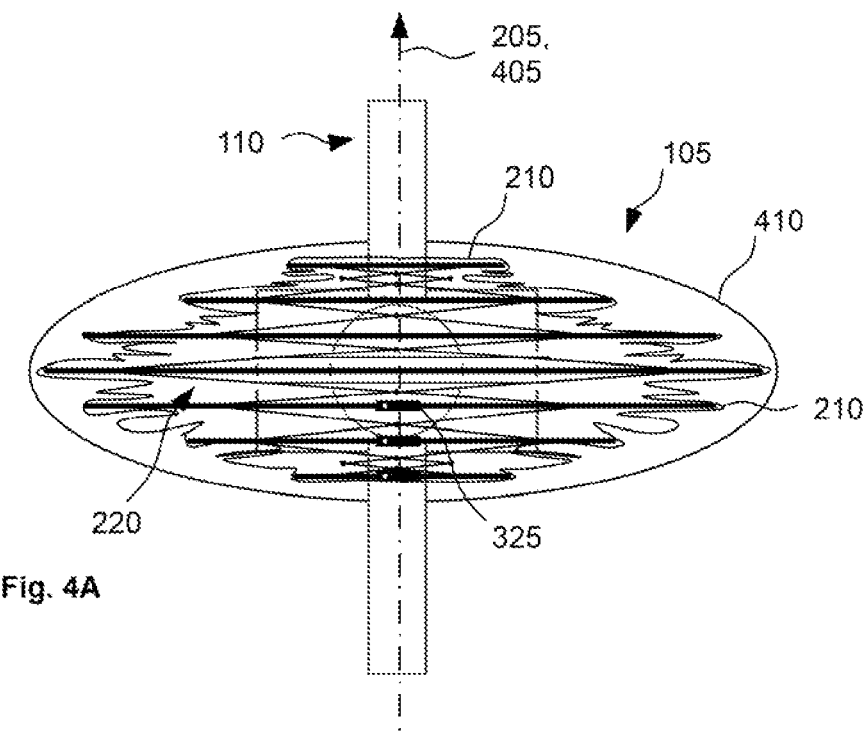
FIGS. 4A and 4B show a roof cargo box in plan view at different orientations.
Figure 4B:
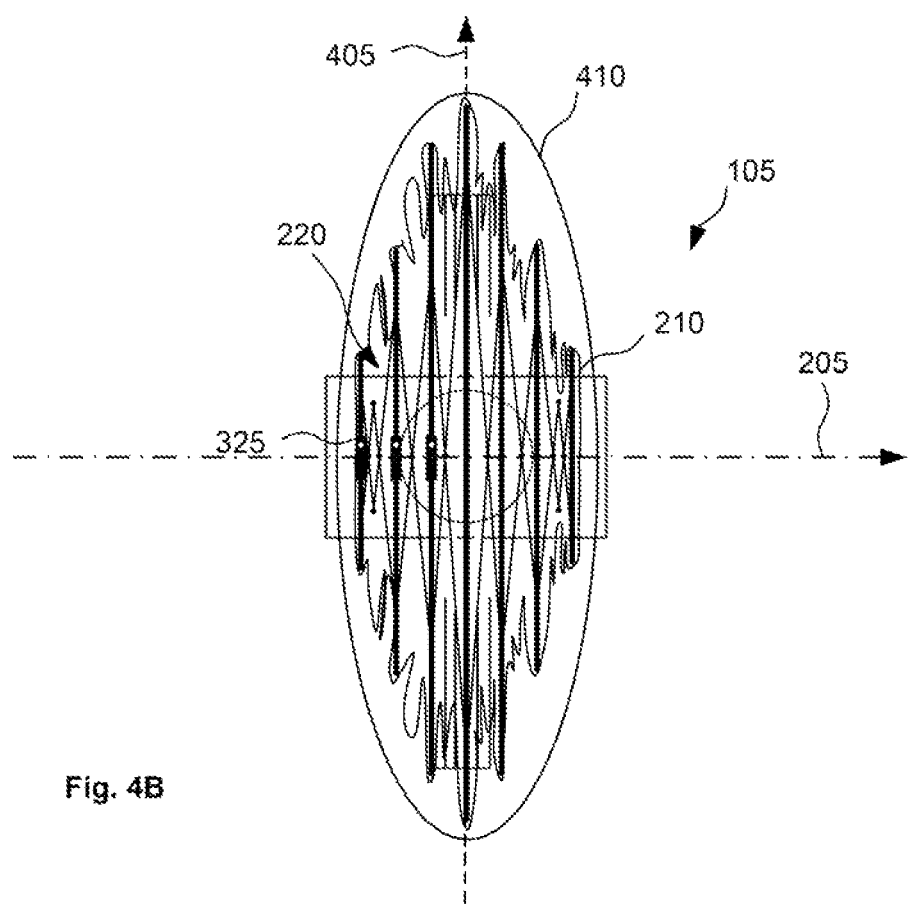

FIGS. 4A and 4B show a roof cargo box 105 in plan view in different orientations. FIG. 4A shows an orientation wherein the longitudinal axis 205 runs parallel to a longitudinal axis 405 of a motor vehicle 115 when the roof cargo box 105 is mounted on the vehicle via the roof cargo box carrier 110. FIG. 4B shows an opening wherein the roof cargo box 105 is rotated by 90° in a clockwise direction relative to the schematic of FIG. 4A so that the longitudinal axis 205 and the longitudinal axis 405 of the motor vehicle 115 conjointly define a right angle.

In both schematics, the roof cargo box 105 is shown in a compressed configuration wherein the frames 215 lie one next to the other as closely as possible and a length of the roof cargo box 105 along the longitudinal axis 205 is minimal. The shell 210 is folded together. This configuration can also be characterized as depressed. In contrast to the foregoing, FIG. 2 shows an expanded configuration wherein the mutually adjacent frames 215 are maximally mutually distanced and a length of the roof cargo box 105 along the longitudinal axis 205 is maximal. The scissors mechanism 220 is shown in FIGS. 4A and 4B in a schematic manner.

A covering 410 can be pulled over the compressed roof cargo box 105 in order to protect the same against water or contaminants or in both alignments in order to make the upward axis aerodynamic. If the covering 410 is not needed, then it can be stored, for example, in the interior space of the roof cargo box 105 or can, for example, be stored in a superimposed outer pocket.

The different structural elements of the roof cargo box 105 disclosed herein can be made from any suitable material or a combination of materials such as metal, plastic, nylon, rubber or any other material having adequate structural strength sufficient to withstand the occurring folds during use. Especially, an element made of plastic can be reinforced by an element made of another material, especially, a fiber material. The materials can each be selected based on their durability, flexibility, weight and/or aesthetic qualities.

Figure 5:
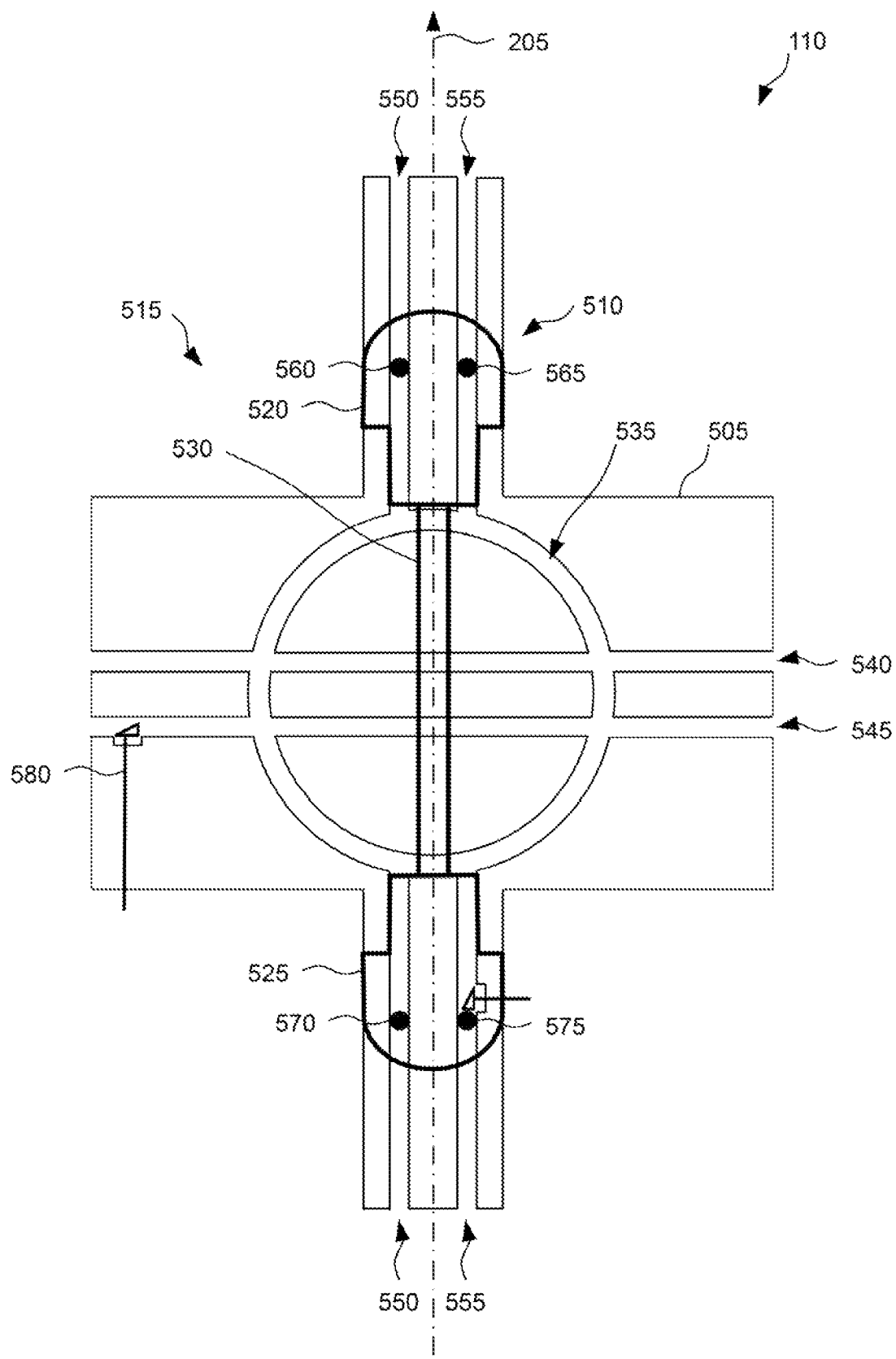
FIG. 5 shows a roof cargo box in a schematic plan view.

FIG. 5 shows the roof cargo box carrier 110 in a schematic plan view. The roof cargo box carrier 110 is preferably for attachment of a roof cargo box 105 to a motor vehicle 115. The roof cargo box carrier 110 includes a first attachment unit 505 for mounting on the motor vehicle 115, for example, on a roof railing or an attachment point provided therefor and a second attachment unit 510 for mounting on the roof cargo box 105. The attachment units 505 and 510 are connected to each other via a mechanism 515. The mechanism 515 permits a predetermined movability of the attachment units 505 and 510 to each other. It is noted that the attachment units 505 and 510 are shown in embodiments by way of example. The specific configurations of these embodiments are essentially determined by their application for mounting onto the vehicle 115 or, more specifically, to the roof cargo box 105 and the configuration of the mechanism 515.

The shown first attachment unit 505 can be derived from a plate which is formed rectangularly or as a plus sign. In an embodiment, the first attachment unit 505 can be fastened to the motor vehicle 115, for example, via a clamp or threaded fastener. The second attachment unit 510 can be formed as desired and is preferably made of a rigid, planar element. In the embodiment shown, the second attachment unit 510 includes a first section 520 and a second section 525 which are connected to each other via a connection 530. Here, one of the two sections 520, 525 can be movable along an extending direction of the connection 530 so that the sections 520 and 525 can be brought closer to each other or can be separated from each other, for example, via a telescopic guide. The telescopic guide can, in the interior, be a pull or push spring (not shown) in order to press or pull the sections 520, 525 into a predetermined position. The spring can contribute to move the roof cargo box 105 in an expanded configuration.

The article 120 can be accommodated in the interior of the roof cargo box 105 without further securing the same. In a further embodiment, a fixing element for the article 120 in the roof cargo box 105 can be provided, for example, by an adjustable belt, a pocket or an elastic pull. Article 120, which is to be transported in the roof cargo box 105, is usually too bulky to transport the same in a cargo space of the motor vehicle 115. For example, the article 120, which is shown by the broken line, includes a surfboard 125 and a bag 130 wherein a sail and/or a mast can be accommodated as well as a wishbone boom 135.

The mechanism 515 preferably permits bringing the first attachment unit 505 into engagement with the second attachment unit 510 for a release of the same. Furthermore, the attachment units 505, 510 can be rotated in mutually opposite directions about an upward axis while they are in mutual engagement. In specific positions of the attachment units 505 and 510 to each other, it can be possible to separate the sections 520 and 525 from each other or to move the same toward each other.

The mechanism 515 is preferably formed by an arrangement of slotted guidance which include a slot and a slot stone accommodated therein.

In the illustrated embodiment, a first slot 535, a second slot 540 and a third slot 545 are provided on the first attachment unit 505. The first slot 535 extends along a circular line in horizontal direction. The second slot 540 and the third slot 545 extend along respective secants to the circular line. The secants lie on different sides of a diameter of the circle line and are at the same distances to the diameter. The slots 540 and 545 extend preferably in transverse direction of the motor vehicle 115 when the first attachment unit 505 is mounted on the motor vehicle 115.

An elastic element, such as a foam interior layer or a rubber lip, can be provided on an inner side of a frame 215 in order to prevent a pressure point or damage to the article 120. The elastic element can permit the transport of an article 120 without an additional attachment in the interior of the roof cargo box 105. Stated otherwise, the article 120 can lie loosely in the interior of the roof cargo box 105.

Optionally, a fourth slot 550 and a fifth slot 555 can be provided which lie on different sides of a further diameter to the circular line and assume these equal distances. Slots 550, 555 and slots 540, 545 conjointly form respective right angles. In this way, the slots 550 and 555 lie preferably parallel to a longitudinal axis of the motor vehicle 115. The parallel running slots 550, 555 can ensure a high torsion strength and a stiffness countering a tilting about the longitudinal axis 405 of the motor vehicle 115. In the embodiment shown, the slots 550 and 555 extend toward to each other on opposite lying sides of the first slot 535; however, they run preferably not within the circular line which follows the first slot 535.

Preferably, four slot stones are applied on the second attachment unit 510. The four slot stones can be introduced into respective slots 535 to 555. A first slot stone 560 and a second slot stone 565 are rigidly applied against each other on a first section 520 and a third slot stone 570 and a fourth slot stone 575 are mutually opposed on the second section 525. The first slot stone 560 and the third slot stone 570 are in the fourth slot 550 as shown in FIG. 5 and the second slot stone 565 and the fourth slot stone 575 are in the fifth slot 555.

In order to limit the sections 520, 525 with respect to the first attachment unit 505, one or several latches 580 can be provided. A latch 580 is configured to limit the path of a slot stone 560 to 575 in a slot 535 to 555 in one or both directions along the slot. The latch 580 can be configured in the manner of a latch mechanism which can permit the same to be passed by a slot stone 560 to 575 in a predetermined direction and prevent a passing in the opposite direction.

In an embodiment shown by way of example, a wedge-shaped latch 580 is provided which can be introduced perpendicularly to the third slot 545. An elastic element can be provided in order to hold the latch 580 in the shown position. From this position, the latch can be deflected out via a slot stone 560 to 575. The slot stone 560 to 575 can pass the latch 580 from left to right. A manual latching can be possible in order to force the latch 580 against the force of the elastic element from the third slot 545 and so permit passing the slot stones 560 to 575. Other embodiments of a latching 580, for example, by means of a rotating lock are likewise possible.

FIGS. 6A to 6F show an exemplary coupling procedure of a roof cargo box carrier 110. FIG. 6A to FIG. 6F show different states which are run through when removing the second attachment unit 510 from the first attachment unit 505. In FIGS. 6A to 6E, effective arrows indicate which movement one of the sections 520, 525 run through in order to arrive at the position shown in the following FIGS. 6B to 6F. For the shown sequence, one proceeds from the embodiment of the roof cargo box carrier 110 shown in FIG. 5.

Figure 6A:
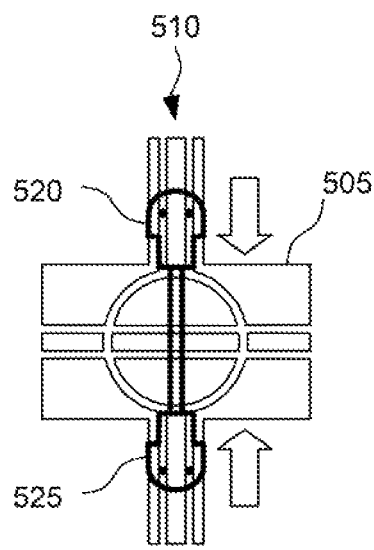
FIGS. 6A to 6F show exemplary coupling procedures of a roof cargo box carrier.
Figure 6B:
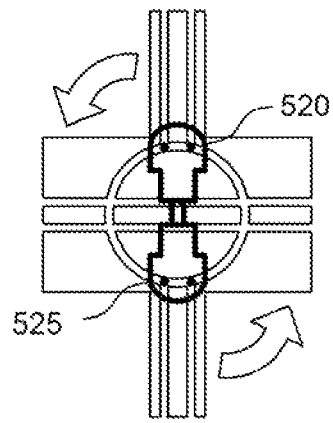

In FIG. 6A, the sections 520, 525 are shown in the position illustrated in FIG. 5. One or several of the slot stones 560 to 575 can be fixed in one or two directions along corresponding slots 550, 555 via a latch 580 so that the slot stones 560 to 575 in the slots 550, 555 can be pushed so far that they reach the first slot 535 as shown in FIG. 6B.

Now the second attachment unit 510 can be rotated relative to the first attachment unit 505 and, by way of example, in the counterclockwise direction. In this way, the slot stones 560 to 575 run in the first slot 535 to the position shown in FIG. 6C.

Figure 6C:
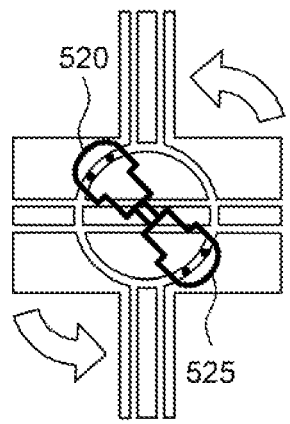
Figure 6D:
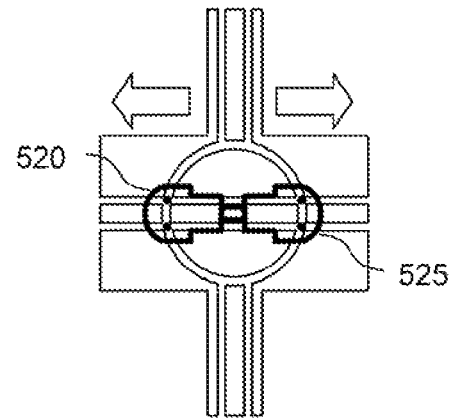

From there, the rotation can be continued until the first slot stone 560 and the third slot stone 570 lie in the third slot 545 and the two slot stones 565 and 575 lie in the second slot 540 as shown in FIG. 6D.

Figure 6E:
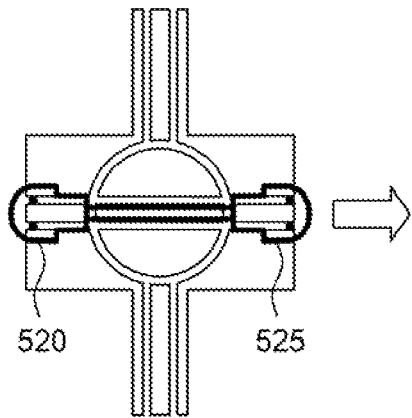

Optionally, the sections 520 and 525 can be separated from each other. The slot stones 560, 565 and/or 570, 575 can be pushed in the slots 540, 545. A configuration is then obtained which is shown in FIG. 6E.

Figure 6F:
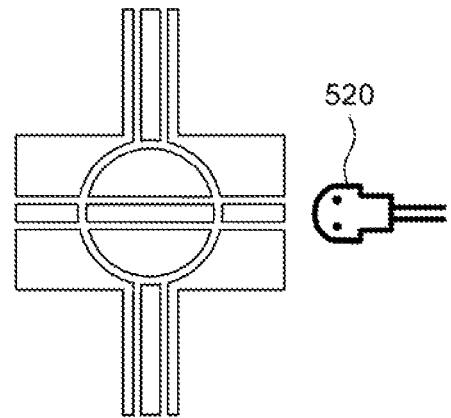

In the embodiment shown, the second attachment unit 510 can, via a lateral displacement right, be separated from the first attachment unit 505. In order to prevent the situation wherein one of the slot stones 560 to 575 unintendedly leaves the slots 535 to 545, one or several latches 580 can be provided which can be manually released in order to make the separation possible. FIG. 6F shows the first attachment unit 505 from which the second attachment unit 510 is removed.

To apply the second attachment unit 510 to the first attachment unit 505, the steps shown can be run through in the opposite sequence. It is noted that the procedure can be simply configured when the sections 520, 525 are not set up to be moved toward each other or away from each other. In this case, a mutual distance is to be so selected as shown in FIGS. 6B to 6D.

Figure 7:
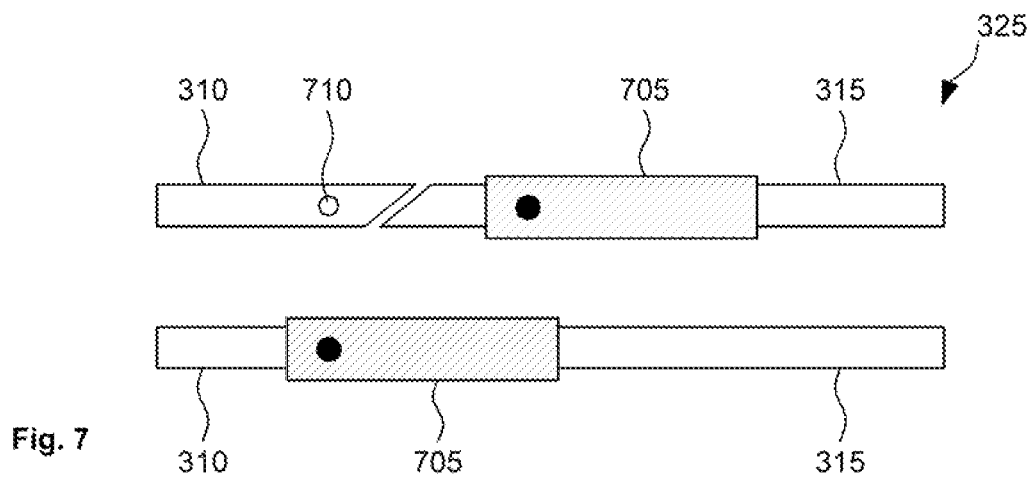
FIG. 7 shows an embodiment of a lock for a frame.

FIG. 7 shows an embodiment of a lock 325 for connecting sections 310, 315 of a frame 215. In the upper region of FIG. 7, a lock 325 is opened and shown closed in the lower region. In order to close the lock 325, the ends of the sections 310, 315 can first be brought closer to each other. As shown, the ends can be beveled or in some other way set up to be brought into a mutual aligned position. In other embodiments, one of the ends can be conical and the other end have a corresponding recess. To establish a force tight connection between the sections 310 and 315, a sleeve 705, which here by way of example is pushed onto the third section 315, is axially so pushed that it contains the ends of both sections 310, 315. An axial position of the sleeve 705 can, for example, be fixed via a spring loaded latch element 710 which here is mounted on the first section 305. A cutout can be provided on the sleeve 705 into which the latch element 710 can engage from the interior. In order to unlatch the sleeve 705, a latch element can be pushed back through the cutout.

Figure 8:
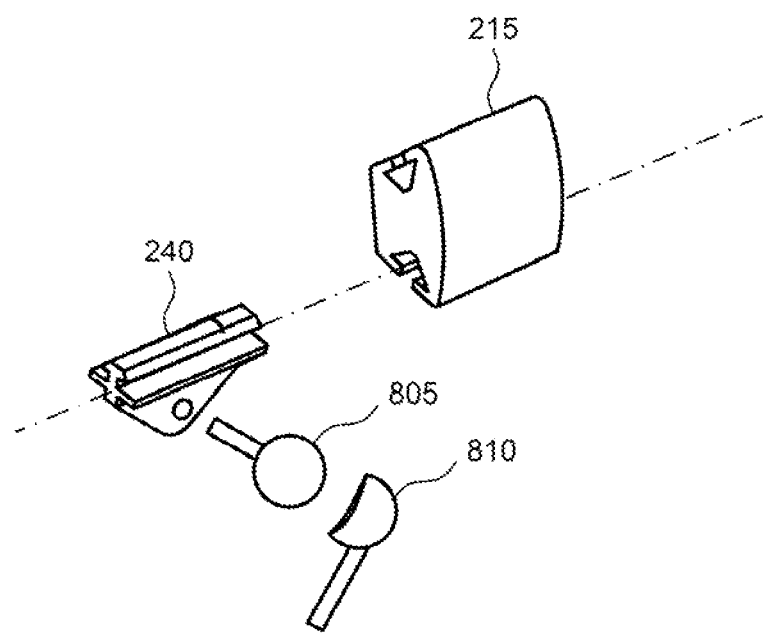
FIG. 8 shows an embodiment of a slider on a frame.

FIG. 8 shows an exploded view of an embodiment of a slider 240 on a frame 215. In the embodiment shown, the frame 215 includes a slot in which the slider 240 engages in the manner of a slot stone. Other embodiments are likewise possible. A rotational joint in the manner of the rotational joint 235 can be used to connect the slider 240 to the scissors mechanism 220. In another embodiment shown in FIG. 8, the joint can be formed by a ball 805 and a ball socket 810. The ball 805 and the socket 810 can be in a loose connection which preferably can be secured via a lock pin. In this way, the opening and closing of a connection between sections 310, 315 of a frame 215 can be supported. The ball 805 is mounted on the slider 240 and the socket 810 can be connected to an end of a lever 230. In another embodiment, the ball 805 and the socket 810 can be mutually exchanged.

It is understood that the foregoing description is that of the preferred embodiments of the invention and that various changes and modifications may be made thereto without departing from the spirit and scope of the invention as defined in the appended claims.

REFERENCE LIST

100 System
105 Roof Cargo Box
110 Roof Cargo Box Carrier
115 Vehicle
120 Articles
125 Surf Board
130 Bag with sail, Mast
135 Wishbone Boom
205 Longitudinal Axis
210 Flexible Shell
215 Frame
220 Scissors Mechanism
225 Section
230 Lever
235 Rotational Joint or Swivel Joint
240 Slider
245 Zipper
250 End Element
305 First Section
310 Second Section
315 Third Section
320 Snap Joint
325 Lock
405 Longitudinal Axis of the Vehicle
410 Covering
505 First Attachment Unit (to Vehicle)
510 Second Attachment Unit (to Roof Cargo Box)
515 Mechanism
520 First Section of the First Attachment Unit
525 Second Section of the Second Attachment Unit
530 Connection
535 First Slot (Along Circumference)
540 Second Slot (Along First Secant)
545 Third Slot (Along Second Secant)
550 Fourth Slot
555 Fifth Slot
560 First Slot Stone
565 Second Slot Stone
570 Third Slot Stone
575 Fourth Slot Stone
580 Latch
705 Sleeve
710 Latch Element
805 Ball
810 Ball Socket

What is claimed is:

1. A roof cargo box for mounting on a vehicle, the roof cargo box comprising:
a flexible shell for accommodating an article to be transported;
said flexible shell defining a longitudinal axis;
at least three frames extending in respective planes transversely to said longitudinal axis;
said frames being configured to receive said flexible shell spanned thereon transversely to said longitudinal axis; and,
a scissors mechanism interconnecting said frames so as to permit a movement of said frames along said longitudinal axis between a first position wherein said frames are mutually spaced at a first distance one from the other and a second position wherein said frames are mutually spaced at a second distance one from the other with said second distance being less than said first distance.

2. The roof cargo box of claim 1, wherein:
said roof cargo box has a mid region, a forward region extending from one end of said mid region and a rearward region extending from the other end of said mid region;
said roof cargo box has a highest and widest location in said mid region; and,
said roof cargo box becomes flatter and/or narrower extending from said mid region into said forward region and extending from said mid region into said rearward region.

3. The roof cargo box of claim 1, wherein said scissors mechanism is configured to hold each two mutually adjacent ones of said frames at a same distance to each other.

4. The roof cargo box of claim 1, wherein:
said longitudinal axis defines a longitudinal direction;
said roof cargo box can be brought into a first configuration wherein said shell is spanned in said longitudinal direction between said frames and said roof cargo box assumes a first length; or,
said roof cargo box can be brought into a second configuration wherein said shell is compressed in said longitudinal direction between said frames to assume a second length smaller than said first length.

5. The roof cargo box of claim 1, further comprising:
said flexible shell having a forward region and a rearward region; and,
said flexible shell having a zipper in one of said forward and rearward regions to permit placement of said article in said flexible shell or to remove said article therefrom.

6. The roof cargo box of claim 1, further comprising a latch mechanism to hold said scissors mechanism in a predetermined position.

7. The roof cargo box of claim 1, wherein said shell is reinforced by a mesh of wire or a mesh of fibers.

8. A roof cargo box carrier for accommodating a roof cargo box on a vehicle, said roof cargo box carrier comprising:
a first attachment unit for attachment to said vehicle;
a second attachment unit for attachment to said roof cargo box;
said first and second attachment units conjointly defining an interface therebetween; and,
a mechanism at said interface configured to permit a separation of said first and second attachment units from each other in response to a rotation of said first and second attachment units relative to each other through a predetermined angle of rotation.

9. A roof cargo box carrier for accommodating a roof cargo box on a vehicle, said roof cargo box carrier comprising:
a first attachment unit for attachment to said vehicle;
a second attachment unit for attachment to said roof cargo box;
a mechanism for rotating said first and second attachment units against each other through at least 90°; and,
said mechanism being separable to permit a separation of said first attachment unit from said second attachment unit;
wherein:
said first attachment unit includes a first slot which follows a circular line;
said first attachment unit includes a second slot and a third slot which run along secants to said circular line;
said secants run on different sides of a diameter of said circular line and have a like spacing to said diameter; and,
said second attachment unit includes four slot stones which are so spaced from each other that two of said four slot stones are pushed into said second slot and the two remaining slot stones are pushed into said third slot so that said four slot stones also lie in said first slot.

10. The roof cargo box carrier of claim 9, further comprising a latch for holding one of said slot stones introduced into a corresponding one of said slots in said corresponding one of said slots.

11. A roof cargo box system for mounting on a vehicle, the system comprising:
a roof cargo box;
a roof cargo box carrier for accommodating said roof cargo box on a vehicle, said roof cargo box carrier including: a first attachment unit for attachment to said vehicle; a second attachment unit for attachment to said roof cargo box;
said first and second attachment units conjointly defining an interface therebetween;
a mechanism at said interface configured to permit a separation of said first and second attachment units from each other in response to a rotation of said first and second attachment units relative to each other through a predetermined angle of rotation;
said roof cargo box including: a flexible shell for accommodating an article to be transported; said flexible shell defining a longitudinal axis; at least three frames extending in respective planes transversely to said longitudinal axis; said frames being configured to receive said shell spanned thereon transversely to said longitudinal axis; and,
a scissors mechanism interconnecting said frames so as to permit a movement of said frames along said longitudinal axis between a first position wherein said frames are mutually spaced at a first distance one from the other and a second position wherein said frames are mutually spaced at a second distance one from the other with said second distance being less than said first distance.

12. A roof cargo box system for mounting on a vehicle, the system comprising:
a roof cargo box;
a roof cargo box carrier for accommodating said roof cargo box on a vehicle, said roof cargo box carrier including: a first attachment unit for attachment to said vehicle; a second attachment unit for attachment to said roof cargo box; a mechanism for rotating said first and second attachment units against each other through at least 90°; and, said mechanism being separable to permit a separation of said first attachment unit from said second attachment unit; and,
said roof cargo box including: a flexible shell for accommodating an article to be transported; said flexible shell defining a longitudinal axis; at least three frames extending in respective planes transversely to said longitudinal axis; said frames being configured to receive said shell spanned thereon transversely to said longitudinal axis; and, a scissors mechanism to hold said frames in a predetermined spaced relationship to each other along said longitudinal axis;
wherein:
said vehicle defines a longitudinal axis;
said first attachment unit includes a first slot which follows a circular line;
said first attachment unit includes a second slot and a third slot which run along secants to said circular line;
said secants run on different sides of a diameter of said circular line and have a like spacing to said diameter;
said second attachment unit includes four slot stones which are so spaced from each other that two of said four slot stones are pushed into said second slot and the two remaining slot stones are pushed into said third slot so that said four slot stones also lie in said first slot;
said second slot and said third slot run transverse to said longitudinal axis of said vehicle;

said mechanism can be closed in that said four slot stones laterally and in pairs are pushed into said second and third slots until they lie at intercepts of said secants with said circular line; and, when at said intercepts, said second attachment unit is rotated about an upward axis relative to said first attachment unit so that said four slot stones leave said second and third slots and are only still guided in said first slot.

13. The roof cargo box carrier of claim 8, wherein said predetermined angle of rotation is at least 90°.

14. The roof cargo box system for mounting on a vehicle of claim 11, wherein said predetermined angle of rotation is at least 90°.

15. A roof cargo box for mounting on a vehicle, the roof cargo box comprising:
- a flexible shell for accommodating an article to be transported;
- said flexible shell defining a longitudinal axis;
- at least three frames extending in respective planes transversely to said longitudinal axis;
- said frames being configured to receive said flexible shell spanned thereon transversely to said longitudinal axis; and,
- a scissors mechanism interconnecting said frames so as to permit a movement of said frames along said longitudinal axis between a first position wherein said frames are mutually spaced at a distance one from the other and a second position wherein said frames are disposed one next to the other in a collapsed or compressed state.

* * * * *